(12) United States Patent
O'Connell, Jr. et al.

(10) Patent No.: US 9,639,547 B2
(45) Date of Patent: May 2, 2017

(54) METHOD AND SYSTEM FOR FILE-SYSTEM BASED CACHING

(71) Applicant: Open Text SA ULC, Halifax (CA)

(72) Inventors: Conleth S. O'Connell, Jr., Austin, TX (US); Maxwell J. Berenson, Austin, TX (US); N. Isaac Rajkumar, Hyderabad (IN)

(73) Assignee: Open Text SA ULC, Halifax (CA)

( * ) Notice: Subject to any disclaimer, the term of this patent is extended or adjusted under 35 U.S.C. 154(b) by 59 days.

(21) Appl. No.: 14/486,588

(22) Filed: Sep. 15, 2014

(65) Prior Publication Data

US 2015/0006819 A1 Jan. 1, 2015

Related U.S. Application Data

(63) Continuation-in-part of application No. 12/835,004, filed on Jul. 13, 2010, now Pat. No. 8,856,210, which
(Continued)

(51) Int. Cl.
*G06F 17/30* (2006.01)
*G06F 12/0802* (2016.01)
*H04L 29/12* (2006.01)

(52) U.S. Cl.
CPC .... *G06F 17/30132* (2013.01); *G06F 12/0802* (2013.01); *G06F 17/30876* (2013.01);
(Continued)

(58) Field of Classification Search
CPC ......... G06F 17/30132; G06F 17/30876; G06F 17/30902; G06F 12/0802
See application file for complete search history.

(56) References Cited

U.S. PATENT DOCUMENTS 5,202,982 A 4/1993 Gramlich et al.
5,473,772 A 12/1995 Halliwell et al.
(Continued)

OTHER PUBLICATIONS

Dasgupta, Partha, "Resource Location in Very Large Networks," Proceedings of IEEE Workshop on Services for Distributed and Networked Environments, pp. 156-163, Jun. 1994.
(Continued)

*Primary Examiner* — Edward Dudek, Jr.
(74) *Attorney, Agent, or Firm* — Sprinkle IP Law Group

(57) ABSTRACT

A method and system for file-system based caching can be used to improve efficiency and security at network sites. In one set of embodiments, the delivery of content and storing content component(s) formed during generation of the content may be performed by different software components. Content that changes at a relatively high frequency or is likely to be regenerated between requests may not have some or all of its corresponding files cached. Additionally, extra white space may be removed before storing to reduce the file size. File mapping may be performed to ensure that a directory within the cache will have an optimal number of files. Security at the network site may be increased by using an internally generated filename that is not used or seen by the client computer. Many variations may be used is achieving any one or more of the advantages described herein.

20 Claims, 6 Drawing Sheets

Related U.S. Application Data is a continuation-in-part of application No. 11/641,496, filed on Dec. 18, 2006, now Pat. No. 7,761,497, which is a continuation-in-part of application No. 11/348,645, filed on Feb. 7, 2006, now Pat. No. 7,716,342, which is a continuation of application No. 10/195,798, filed on Jul. 15, 2002, now Pat. No. 7,024,452.

(60) Provisional application No. 60/305,320, filed on Jul. 13, 2001.

(52) U.S. Cl.
CPC .... *G06F 17/30902* (2013.01); *H04L 61/1582* (2013.01); *H04L 29/12179* (2013.01)

(56) References Cited

U.S. PATENT DOCUMENTS

| | | |
|---|---|---|
| 5,504,879 A | 4/1996 | Eisenberg et al. |
| 5,740,430 A | 4/1998 | Rosenberg et al. |
| 5,893,140 A | 4/1999 | Vahalia et al. |
| 5,894,554 A | 4/1999 | Lowery et al. |
| 5,928,323 A | 7/1999 | Gosling et al. |
| 6,012,098 A | 1/2000 | Bayeh et al. |
| 6,041,334 A | 3/2000 | Cannon |
| 6,112,212 A | 8/2000 | Heitler |
| 6,151,624 A | 11/2000 | Teare et al. |
| 6,192,415 B1 | 2/2001 | Haverstock et al. |
| 6,198,824 B1 | 3/2001 | Shambroom |
| 6,208,991 B1 | 3/2001 | French et al. |
| 6,260,069 B1 | 7/2001 | Anglin |
| 6,272,492 B1 | 8/2001 | Kay |
| 6,272,593 B1 | 8/2001 | Dujari |
| 6,408,360 B1 | 6/2002 | Chamberlain et al. |
| 6,571,246 B1 | 5/2003 | Anderson et al. |
| 6,571,259 B1 | 5/2003 | Zheng et al. |
| 6,622,168 B1 | 9/2003 | Datta |
| 6,643,652 B2 | 11/2003 | Helgeson et al. |
| 6,651,217 B1 | 11/2003 | Kennedy et al. |
| 6,694,317 B1 | 2/2004 | Stakutis et al. |
| 6,697,815 B1 | 2/2004 | Wilson |
| 6,697,844 B1 | 2/2004 | Chan et al. |
| 6,701,428 B1 | 3/2004 | Harvey, III et al. |
| 6,754,621 B1 | 6/2004 | Cunningham et al. |
| 6,757,708 B1 * | 6/2004 | Craig ............... G06F 17/30902 707/999.01 |
| 6,829,637 B2 | 12/2004 | Kokku et al. |
| 6,850,941 B1 | 2/2005 | White et al. |
| 7,024,452 B1 | 4/2006 | O'Connell, Jr. et al. |
| 7,127,608 B2 | 10/2006 | Royer et al. |
| 7,185,011 B1 | 2/2007 | Dujari |
| 7,249,157 B2 | 7/2007 | Stewart et al. |
| 7,349,942 B1 | 3/2008 | O'Connell, Jr. et al. |
| 7,716,342 B2 | 5/2010 | O'Connell, Jr. et al. |
| 7,761,497 B1 | 7/2010 | O'Connell, Jr. et al. |
| 8,352,680 B2 | 1/2013 | O'Connell, Jr. et al. |
| 8,856,210 B2 | 10/2014 | O'Connell, Jr. et al. |
| 2001/0032254 A1 | 10/2001 | Hawkins |
| 2001/0034771 A1 | 10/2001 | Hutsch et al. |
| 2002/0013779 A1 | 1/2002 | Sridhar |
| 2002/0016736 A1 | 2/2002 | Cannon et al. |
| 2002/0032906 A1 | 3/2002 | Grossman |
| 2002/0065912 A1 | 5/2002 | Catchpole et al. |
| 2002/0099807 A1 * | 7/2002 | Doyle ............... G06F 17/30902 709/223 |
| 2002/0120677 A1 | 8/2002 | Goward et al. |
| 2002/0165877 A1 | 11/2002 | Malcolm et al. |
| 2002/0165911 A1 | 11/2002 | Gabber et al. |
| 2002/0178187 A1 | 11/2002 | Rasmussen et al. |
| 2003/0120752 A1 | 6/2003 | Corcoran |
| 2003/0217117 A1 | 11/2003 | Dan et al. |
| 2004/0030697 A1 | 2/2004 | Cochran et al. |
| 2004/0205452 A1 | 10/2004 | Fitzsimmons et al. |
| 2010/0306314 A1 | 12/2010 | O'Connell, Jr. et al. |
| 2014/0379844 A1 | 12/2014 | O'Connell, Jr. et al. |

OTHER PUBLICATIONS

Vetter, Ronald, J., "Mosaic and the World-Wide Web," IEEE Computer, vol. 27, issue 10, pp. 49-57, Oct. 1994.

Obraczka, Katia, et al., "Internet Resource Discovery Services," IEEE Computer, vol. 26, issue 9, pp. 8-22, Sep. 1993.

Sharma, Praveen Kant, et al., "Hypertext Based Distributed Object Management for Information Location and Retrieval," IEEE Engineering Management Conference, pp. 102-107, Dec. 1993.

Encryption and Decryption, Feb. 9, 2001, 2 pgs., retrieved at <wysiwyg://101/http://msdn.microsof....brary/wcedoc/wcesecur/crypto_1.htm> printed on May 23, 2001.

Turley, Patrick, "Design Specification for Packaged Application Support in Assassin," Vignette Corporation, Austin, TX 1999, 6 pgs.

Turley, Patrick, Functional Specification for Packaged Application Support in Assassin, Vignette Corporation, Austin, TX 1999, 6 pgs.

Office Action for U.S. Appl. No. 10/195,798, mailed Jan. 14, 2005, 7 pgs.

Office Action for U.S. Appl. No. 10/195,798, mailed Aug. 4, 2004, 12 pgs.

Office Action for U.S. Appl. No. 10/195,578, mailed Feb. 22, 2007, 24 pgs.

Office Action for U.S. Appl. No. 10/195,578, mailed Oct. 2, 2006, 21 pgs.

Office Action for U.S. Appl. No. 10/195,578, mailed Mar. 31, 2006, 16 pgs.

Office Action for U.S. Appl. No. 10/195,578, mailed Oct. 7, 2005, 12 pgs.

Office Action for U.S. Appl. No. 10/195,798, mailed Jun. 10, 2005, 8 pgs.

Office Action for U.S. Appl. No. 10/334,515, mailed Jun. 28, 2006, 10 pgs.

Office Action for U.S. Appl. No. 10/334,515, mailed Jan. 26, 2007, 11 pgs.

Office Action for U.S. Appl. No. 11/348,645, mailed Jan. 21, 2009, 14 pgs.

Office Action for U.S. Appl. No. 11/348,645, mailed Jul. 6, 2009, 13 pgs.

Office Action for U.S. Appl. No. 11/641,496, mailed Sep. 28, 2009, 15 pgs.

Office Action for U.S. Appl. No. 12/763,059, mailed Aug. 18, 2010, 18 pgs.

Office Action for U.S. Appl. No. 12/763,059, mailed Feb. 25, 2011, 14 pgs.

Office Action for U.S. Appl. No. 12/835,004, mailed Jan. 4, 2012, 7 pgs.

Office Action for U.S. Appl. No. 12/835,004, mailed Jun. 20, 2012, 41 pgs.

Office Action for U.S. Appl. No. 12/835,004, mailed Dec. 27, 2012, 16 pgs.

Office Action for U.S. Appl. No. 12/835,004, mailed Feb. 25, 2014, 50 pgs.

* cited by examiner

METHOD AND SYSTEM FOR FILE-SYSTEM BASED CACHING

CROSS-REFERENCE TO RELATED APPLICATIONS

This application is a continuation-in-part of, and claims a benefit of priority from U.S. patent application Ser. No. 12/835,004, filed Jul. 13, 2010, entitled "SYSTEM, METHOD AND STORAGE MEDIUM FOR MANAGING ITEMS WITHIN FILE DIRECTORY STRUCTURE," now U.S. Pat. No. 8,856,210, which is a continuation of, and claims a benefit of priority from U.S. patent application Ser. No. 11/641,496, filed Dec. 18, 2006, now U.S. Pat. No. 7,761,497, entitled "STORAGE MEDIUM HAVING A MANAGEABLE FILE DIRECTORY STRUCTURE," which is a continuation-in-part of U.S. patent application Ser. No. 11/348,645, filed Feb. 7, 2006, now U.S. Pat. No. 7,716,342, entitled "METHOD AND SYSTEM FOR FILE-SYSTEM BASED CACHING," which is a continuation of U.S. patent application Ser. No. 10/195,798, filed Jul. 15, 2002, now U.S. Pat. No. 7,024,452, entitled "METHOD AND SYSTEM FOR FILE-SYSTEM BASED CACHING," which is a conversion of, and claims a benefit of priority from Provisional Application No. 60/305,320, filed Jul. 13, 2001, entitled "METHOD AND SYSTEM FOR FILE-SYSTEM BASED CACHING." The above-referenced U.S. patent application Ser. No. 11/641,496, filed Dec. 18, 2006, is a continuation of U.S. patent application Ser. No. 10/334,515, filed Dec. 31, 2002, now U.S. Pat. No. 7,349,942, entitled "STORAGE MEDIUM HAVING A MANAGEABLE FILE DIRECTORY STRUCTURE," which is a conversion of, and claims a benefit of priority from Provisional Application No. 60/356,613, filed Feb. 13, 2002, entitled "CACHE MEMORY HAVING A HIERARCHICAL STRUCTURE." This application also relates to U.S. patent application Ser. No. 13/228,714, filed Sep. 9, 2011, now U.S. Pat. No. 8,352,680, entitled "METHOD AND SYSTEM FOR FILE-SYSTEM BASED CACHING," which is a continuation of the U.S. patent application Ser. No. 12/763,059, filed Apr. 19, 2010, now U.S. Pat. No. 8,078,802, entitled "METHOD AND SYSTEM FOR FILE-SYSTEM BASED CACHING," which is a continuation of the above-referenced U.S. patent application Ser. No. 11/348,645, filed Feb. 7, 2006. All patents and applications listed in this paragraph are incorporated herein by reference in their entireties for all purposes.

TECHNICAL FIELD OF THE INVENTION

This invention relates generally to a method of processing content at a network site, and more particularly, to a method of delivering and storing content at a network site, a system, and a computer program product for carrying out the method.

DESCRIPTION OF THE RELATED ART

The Internet includes a large collection of computers operated under a client-server computer network model. FIG. 1 includes an exemplary hardware configuration for accessing a site on a network. A client computer 12 is bi-directionally coupled to a network 14, such as the Internet. A web server 16 is bi-directionally coupled to the network 14, a page generator 18, and a cache 19. Cache 19 may be part of the web server 16 or as a separate hard disk. Specific methods of using the network are described in more detail below.

Many different types of protocols can support dynamic generation of customized pages. U.S. Pat. No. 5,740,430 ("Rosenberg") and U.S. patent application Ser. No. 09/965,914, entitled "METHOD AND SYSTEM FOR CACHE MANAGEMENT OF DYNAMICALLY-GENERATED CONTENT," filed on Sep. 28, 2001 (the "Cache Management Application") disclose methods and systems for caching custom pages to reduce page regeneration. In one conventional method, a request for content in the form of a Uniform Resource Location ("URL") can be sent from the client computer 12 to the web server 16 using the network 14. The web server 16 can convert the URL to a customized URL or "CURL." The web server 16 uses the CURL to determine if the content is in the cache 19. If the content is in the cache 19 (a "cache hit"), the web server 16 retrieves the content from the cache 19 and sends it to the client computer 12.

If the web server 16 did not find the content within the cache 19 (a "cache miss"), the web server 16 instructs the page generator 18 to generate the content. After generating the content, the page generator 18 sends the content to the web server 16. The web server computer 16 stores the content to the cache 19 in accordance with the CURL. After or during storing, the content is sent from the web server 16 to the client computer 12 via the network 14.

The conventional method suffers from problems related to the design and distribution of operations between the hardware and software components at the network site. The process of storing a file is a time consuming process. If the web server 16 stores content before sending it to the client computer 12, the user of the client computer 12 waits for the store to complete. Other users at different client computers (not shown) may also be affected because more of the web server's processing time is occupied by the storing operation. Therefore, all users sending requests to the web server 16 can also be impacted by any cache miss regardless whether they caused the cache miss.

Another problem with the conventional method is related to how files are stored in the cache 19. The cache 19 may have potentially millions of files within a single discrete directory. The time needed to search the cache can be significantly longer when the number of files within a discrete directory becomes larger, especially when over a million files are within one directory. Therefore, even if a cache hit occurs, valuable processing time on the web server 16 is occupied searching the cache 19. Again, all users at client computers making requests to the web server 16 can be adversely impacted.

Still another problem is related to storing. More specifically, all content generated by the page generator 18 is saved within the cache 19. Therefore, regardless whether the content or any portion of it is static or dynamic, all content sent to the web server 16 from the page generator 18 is stored in the cache 19. If the content or any portion of it constantly changes, blindly caching the content can effectively be a waste of valuable computer resources.

The conventional methods also cause a security concern. The web server 16 can store content within the cache 19. In other words, the conventional system can allow a user request to a network site to initiate a store operation to cache 19 using the network site's server computer(s). Network site operators, and particularly their security personnel, are concerned with any publicly-initiated store operations using their server computers because such processes can be manipulated and can lead to potential security breaches.

SUMMARY

A method and system for file-system based caching can be used to improve efficiency and security at network sites. In one set of embodiments, the delivery of content and storing content component(s) formed during generation of the content may be performed by different software components. Content that changes at a relatively high frequency or is likely to be regenerated between requests may not have some or all of its corresponding files cached. Content components may be cached independently from content, so that multiple copies of a single component are not cached with every network page using that component. Also, different content component(s) of the same network page may be stored within different directories. Additionally, extra white space may be removed before storing to reduce the file size. File mapping may be performed to ensure that a directory within the cache will have no more than approximately 4100 files. Security at the network site may be increased by using an internally generated filename that is not used or seen by the client computer. Many variations may be used in achieving any one or more of the advantages described herein. None of the advantages, by itself or collectively, should be construed as an essential or critical to the invention.

In one set of embodiments, a computer program can comprise code embodied in a non-transitory data processing system readable medium. The code can comprise an instruction for sending requested content to a client computer. The instruction for sending can be performed using a first software component. The code can comprise an instruction for storing a content component that forms at least part of the requested content. The instruction for storing can be performed using a second software component. The sending of content may be performed by a web server or page generator software component, and the storing may be performed by the page generator or a cache manager software component, however, the same software component should not be used for sending and storing.

In another set of embodiments, the code can comprise an instruction for forming an instruction for generating content in response to a request. The content may comprise a content component. The code can also comprise an instruction for determining whether the content component is or is not to be stored within a cache.

In still another set of embodiments, the code can comprise an instruction for parsing a request for requested content to form a parsed element corresponding to a caching-related parameter. The code can also comprise an instruction for performing an operation in response to a value of the parsed element.

In other embodiments, methods and systems can be used to perform actions in accordance with the instructions corresponding to the code of the data processing system readable medium. Additional actions may be performed by humans in conjunction with their associated computers. The computer program may reside on one or more computers.

The foregoing general description and the following detailed description are exemplary and explanatory only and are not restrictive of the invention, as defined in the appended claims.

BRIEF DESCRIPTION OF THE DRAWINGS

The invention is illustrated by way of example and not limitation in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

Reference is now made in detail to the exemplary embodiments of the invention, examples of which are illustrated in the accompanying drawings. Wherever possible, the same reference numbers will be used throughout the drawings to refer to the same or like parts (elements).

A method and system for file-system based caching can be used to reply more quickly to client computer requests, cache more quickly and efficiency for only those content component(s) that should be cached, reduce the file size of files cached, optimize the number of files within directories, improve security at network sites, and potentially for other reasons. In one set of embodiments, the delivery of content and storing file(s) used in generating the content may be performed by different software components that are on the same server computer or different server computers. Content that changes at a relatively high frequency or is likely to be regenerated between requests may not have some or all of its corresponding files cached. Also, different content component(s) of the same network page may be stored within different directories. Additionally, extra white space may be removed before storing to reduce the file size. File mapping may be performed to ensure that a directory within the cache will have an optimal number of files. Security at the network site may be increased by using an internally generated filename is not used or seen by the client computer. Many variations may be used in achieving any one or more of the advantages described herein. None of the advantages, by itself or collectively, should be construed as an essential or critical to the invention.

Figure 2:
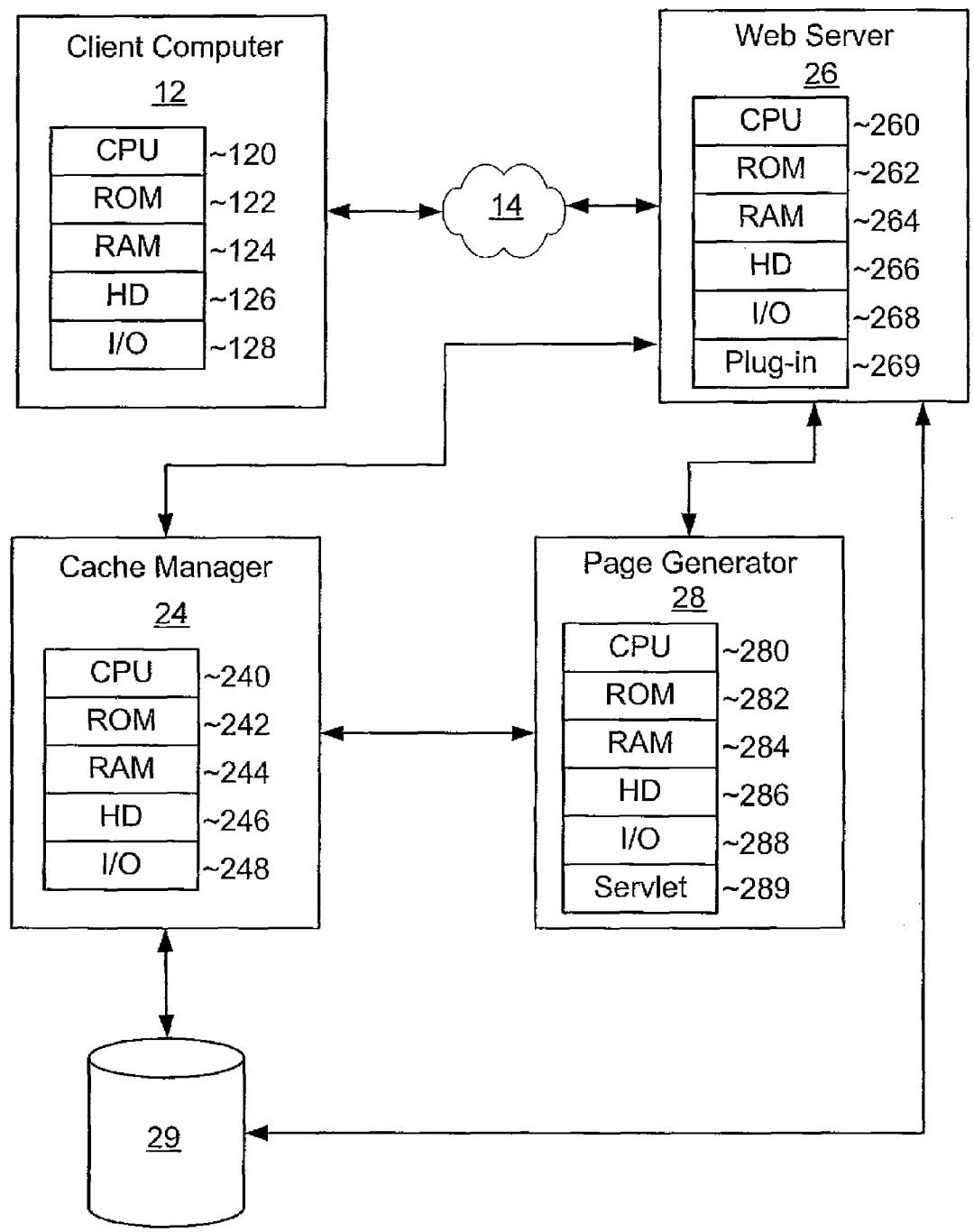
FIG. 2 includes an illustration of a hardware configuration for a network site in accordance with an embodiment of the invention.

Before discussing embodiments of the invention, a hardware architecture for using embodiments is described. FIG. 2 illustrates an exemplary architecture and includes a client computer 12 that can be bi-directionally coupled to a network 14, and a web server 26 that is bi-directionally coupled to the network 14, page generator 28, the cache manager 28, and a cache 29. The cache manager 24 can be bi-directionally coupled to the page generator 28 and the cache 29. Many other alternative configurations are possible and known to skilled artisans. For example, the cache manager 24 is not required, and the computers 26 and 28 may be bi-directionally coupled to the cache 29. Also, the cache manager may be coupled to the web server 26 to send filenames of files that are stored within the cache 29 (i.e., unidirectional coupling rather than bi-directional coupling).

The client computer 12 includes a central processing unit ("CPU") 120, a read-only memory ("ROM") 122, a random access memory ("RAM") 124, a hard drive ("HD") or storage memory 126, and input/output device(s) ("I/O") 128.

The I/O devices 128 can include a keyboard, monitor, printer, electronic pointing device (e.g., mouse, trackball, etc.), or the like. The client computer 12 can include a desktop computer, a laptop computer, a personal digital assistant, a cellular phone, or nearly any other device capable of communicating over the Internet or an intranet.

The web server 26 can include a CPU 260, ROM 262, RAM 264, HD 266, I/O 268, and a plug-in 269. The page generator 28 can include a CPU 280, ROM 282, RAM 284, HD 286, I/O 288, and a servlet (engine) 289. In one non-limiting embodiment, the page generator can be used to fulfill requests of coming from the web server 26. The cache manager 24 can include a CPU 240, ROM 242, RAM 244, HD 246, and I/O 248. Each of the computers in FIG. 2 may have more than one CPU, ROM, RAM, HD, I/O, or other hardware components. For simplicity, each computer is illustrated as having one of each of the hardware components, even if more than one is actually used.

Details of the web server plug-in 269 and the servlet 289, which can be software modules, are described below in more detail. Although the plug-in 269 and servlet 289 are typically stored in HD 266 and HD 286, respectively, and loaded into RAM 264 and RAM 284, respectively, when used. The plug-in 269 and servlet 289 are illustrated as separate components to simplify understanding of the invention.

Each of the computers 12, 24, 26, and 28 is an example of a data processing system. ROM 122, 242, 262, and 282; RAM 124, 244, 264, and 284; HD 126, 246, 266, and 286; and the cache 29 include media that can be read by the CPU 120, 240, 260, or 280. Therefore, each of these types of memories includes a data processing system readable medium. These memories may be internal or external to the computers 12, 24, 26, and 28.

Figure 3:
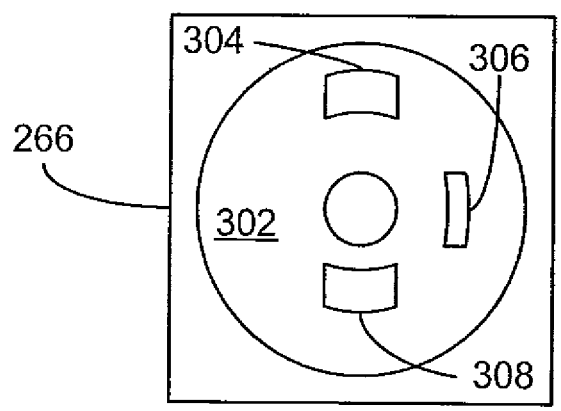
FIG. 3 includes an illustration of a data processing system storage medium including software code having instructions in accordance with an embodiment of the invention.

The methods described herein may be implemented in suitable software code that may reside within ROM 122, 242, 262, or 282, RAM 124, 244, 264, or 284, or HD 126, 246, 266, or 286. In addition to those types of memories, the instructions in an embodiment of the invention may be contained on a data storage device with a different data processing system readable storage medium, such as a floppy diskette. FIG. 3 illustrates a combination of software code elements 304, 306, and 308 that are embodied within a data processing system readable medium 302, on HD 266. Alternatively, the instructions may be stored as software code elements on a DASD array, magnetic tape, floppy diskette, optical storage device, or other appropriate data processing system readable medium or storage device.

Figure 4:
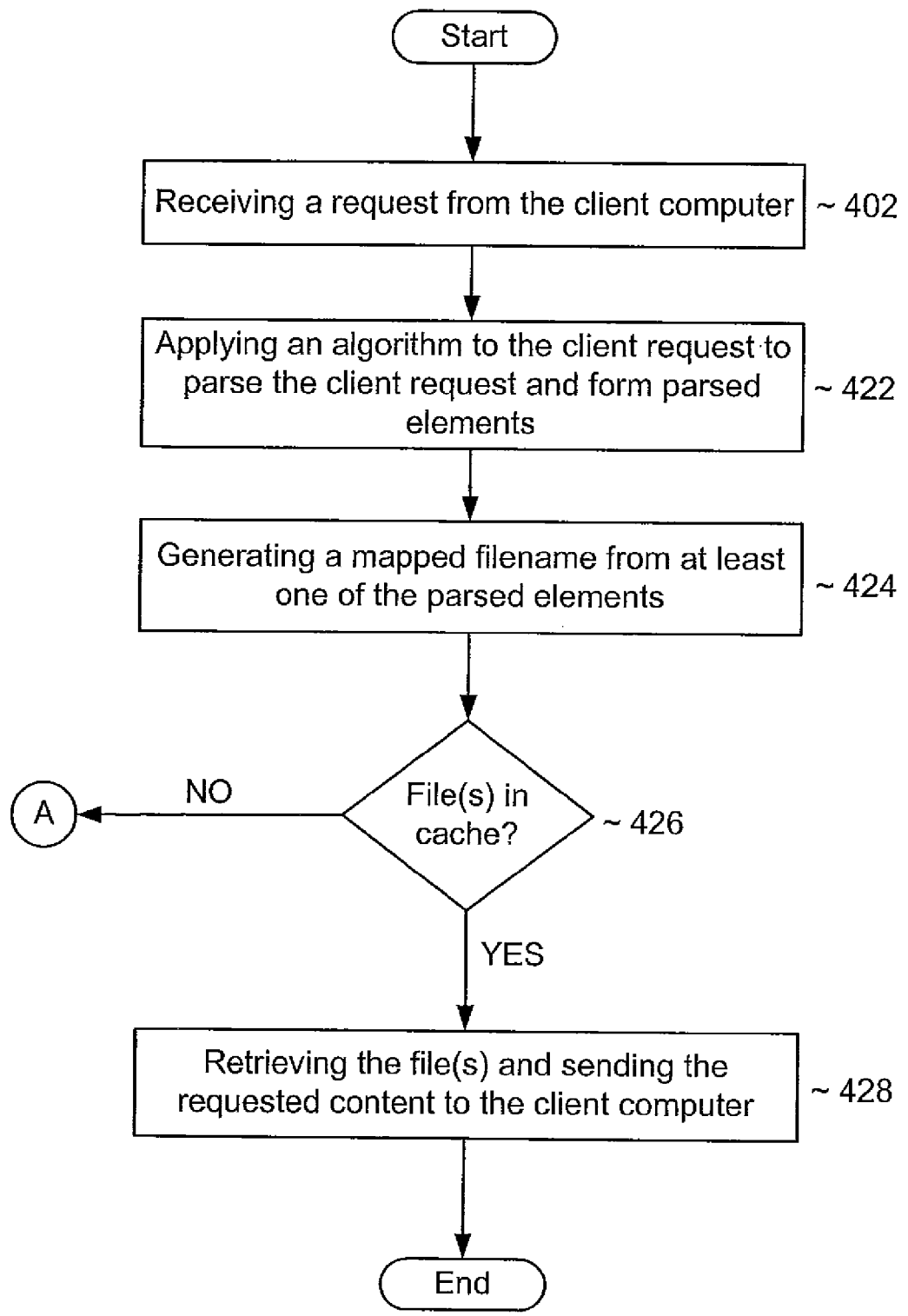
FIGS. 4-6 include a process flow diagram for using the hardware configuration of FIG. 2.
Figure 5:
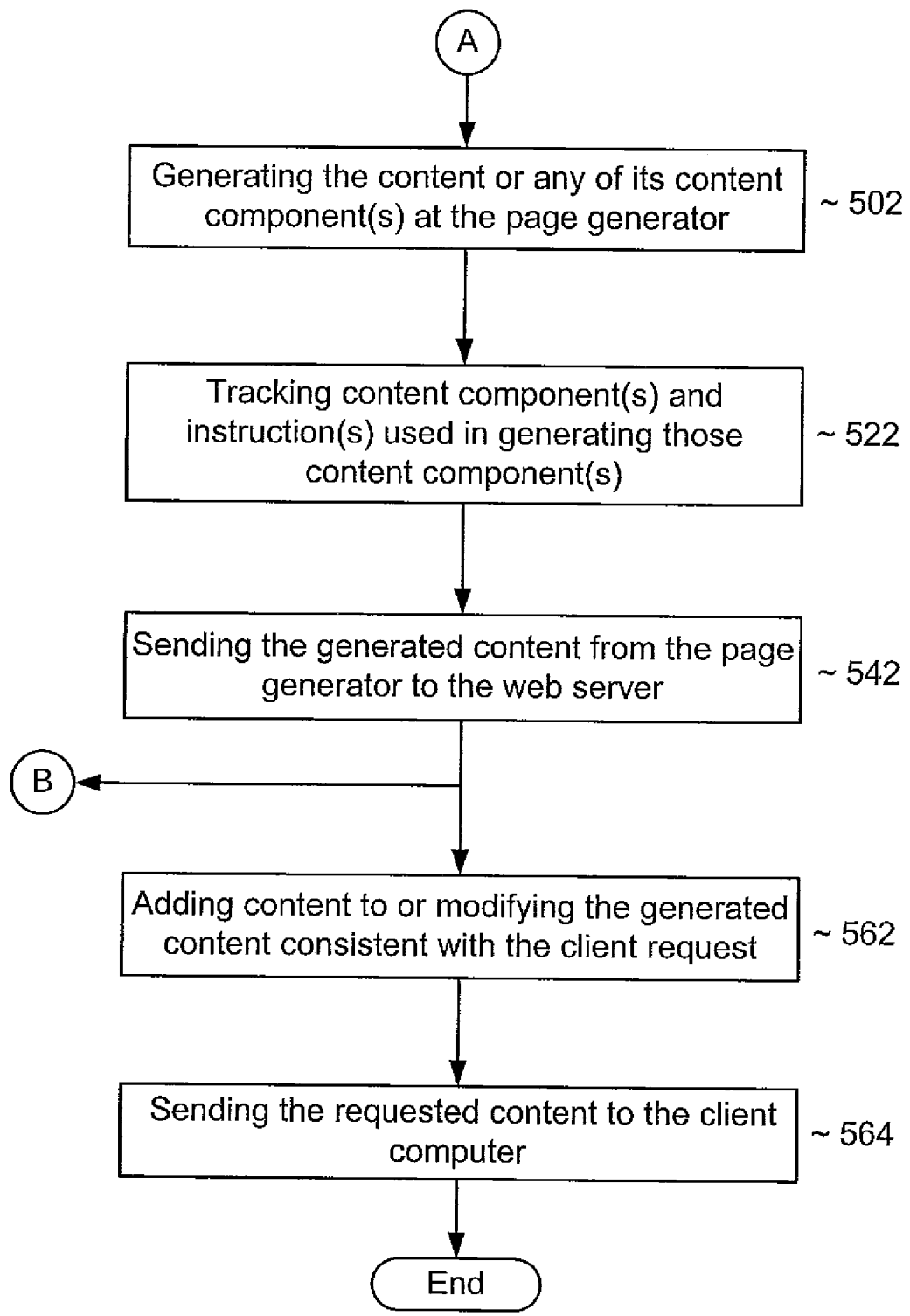
Figure 6:
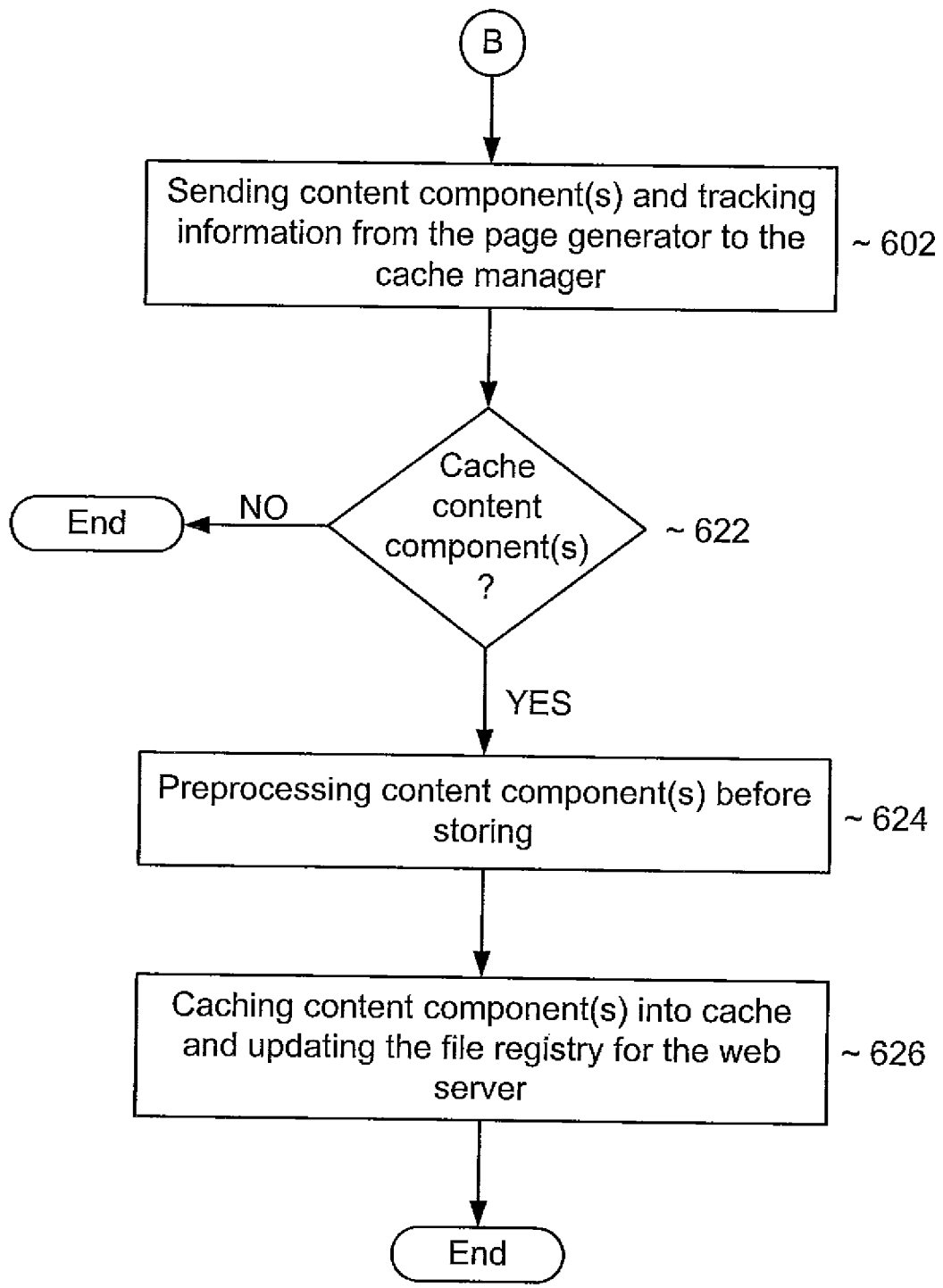

In an illustrative embodiment of the invention, the computer-executable instructions may be lines of compiled C$^{++}$, Java, or other language code. Other architectures may be used. For example, the functions of any one of the computers may be performed by a different computer shown in FIG. 2. Additionally, a computer program or its software components with such code may be embodied in more than one data processing system readable media in more than one computer. Further, other client computers (not shown) or other server computers (not shown) similar to client computer 12 and server computers 24, 26 and 28, respectively, may also be connected to the network 14. FIGS. 4-6 include illustrations, in the form of a flowchart, of the structures and operations of such software programs.

In the hardware configuration above, the various software components (e.g., web server, page generator, cache manager, or the like) are on separate server computers. In alternative embodiments, some or all of the software components may reside on the same server computer. For example, the web server software component and the page generator software component could reside on the same server computer. For simplicity, each of the software components in the embodiments below resides on different server computers.

Communications between any of the computers in FIG. 2 can be accomplished using electronic, optical, radio-frequency, or other signals. When a user is at the client computer 12, the client computer 12 may convert the signals to a human understandable form when sending a communication to the user and may convert input from a human to appropriate electronic, optical, radio-frequency, or other signals to be used by the client computer 12 or the server computer 24, 26, or 28. Similarly, when an operator is at a server computer 24, 26, or 28, that server computer may convert the signals to a human understandable form when sending a communication to the user and may convert input from a human to appropriate electronic, optical, radio-frequency, or other signals to be used by a server computer 24, 26, or 28 or the client computer 12.

A few terms are defined or clarified to aid in understanding the descriptions that follow. A network includes an interconnected set of server and client computers over a publicly available medium (e.g., the Internet) or over an internal (company-owned) system. A user at a client computer may gain access to the network using a network access provider. An Internet Service Provider ("ISP") is a common type of network access provider. A network address includes information that can be used by a server computer to locate information, whether internal to that server computer or at a different, remote computer or database. Uniform Resource Locators ("URLs") are examples of network addresses. A network site typically includes network pages or other information displays at different network addresses for that network site. A web site is a common type of network site, and a web page is a common type of network page. Note that the examples given within this paragraph are for purposes of illustration and not limitation.

The term "content" is intended to mean information sent from a network site to a client computer in response to a request from a user at the client computer. The content is typically in the form of a network page.

The term "content component" is intended to mean at least a portion of the content. In many instances, the content can include a plurality of content components. However, in some instances, the content can be a single content component.

Content, a content component, or both may include a static or dynamic file. A static file does not typically change with time. A dynamic file typically changes with time. Dynamic files may change at a relatively low frequency (e.g., daily, weekly, monthly, annually, etc.) or at a relatively high frequency (e.g., hourly or more frequently, different content each time it is requested, etc.).

The term "network site" is intended to comprise computers used during the normal operation of the network site in response to a request from a client computer. The client computer 12 is outside the network site but may request content from the network site via communications with web server 26.

The term "software component" is intended to mean at least a portion of a computer program (i.e., a software application). Examples include a web server software component, a page generator software component, a cache manager, and the like. Different software components may reside in the same computer program or in different computer programs on the same computer or different computers.

The term "white space" is intended to mean occurrences of information within source code that is ignored by computer if the source code were to be compiled or interpreted by a computer. For example, if one space, two spaces, or one hundred spaces lie between characters, a computer can treat any of these as a single space or no space between characters. Other white space may include tabs and new line commands.

As used herein, the terms "comprises," "comprising," "includes," "including," "has," "having" or any other variation thereof, are intended to cover a non-exclusive inclusion. For example, a method, process, article, or apparatus that comprises a list of elements is not necessarily limited only those elements but may include other elements not expressly listed or inherent to such method, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

FIGS. 4-6 include a process flow diagram of a method of processing content at the network site illustrated in FIG. 2. The method will be briefly addressed before details of the method are described. The method can comprise receiving a client request from a client computer 12 as shown in block 402 of FIG. 4. The method can further comprise applying an algorithm to the client request to parse the client request and form parsed elements (block 422) and generating a mapped filename from at least one of the parsed elements (block 424). A determination can then be made whether the file(s) for the content component(s) is (are) in the cache 29 (diamond 426). If the content is in the cache 29, the method can further comprise retrieving the file(s) and sending requested content to the client computer 12 (block 428). Otherwise ("No" branch of diamond 426), a cache miss has occurred.

When a cache miss has occurred, the method can comprise generating the content or any of its content component(s) at the page generator 28 as shown in block 502 of FIG. 5. The method can also comprise tracking content component(s) and instruction(s) used in generating those content component(s) (collectively, "tracking information") (block 522). After capturing the tracking information, the method can further comprise sending the generated content from the page generator 28 to the web server 26 (block 542). The method can still further comprise adding content to or modifying the generated content consistent with a web server inclusion (block 562) and sending the requested content to the client computer 12 (block 564).

Any time after the generated content is generated ("B" reference in FIG. 5), the method can still further comprise forwarding the content component(s) and tracking information from the page generator 28 to the cache manager 24 as shown in block 602 of FIG. 6. A determination can be made as to which content components, if any, should be cached (diamond 622). The method can also comprise preprocessing the content component(s) before storing (block 624). The method can yet further comprise caching content component(s) into the cache 29 and updating the file registry at the web server 26 (block 626).

After reading this specification, skilled artisans will appreciate that some of the activities described in FIGS. 4-6 may not be required but may provide a more efficiently running network. Also, some of the operations may be moved from one network site computer to another network site computer in order to return requested content to client computers faster. Attention is now turned to a more detailed description of the method illustrated in FIGS. 4-6 and its variants.

Before beginning the method illustrated in FIGS. 4-6, an operator at the network site may develop a mapping algorithm. The mapping algorithm can take the URL and other information with the user request (e.g., locale, language, browser, operating system, etc.), collectively "client request," and parse the client request into parsed elements that may correspond to different parameters. The software components, particularly the web server 26 and the page generator 28, may analyze the parsed elements in determining what content should be sent to the client computer 12. Some of the parameters can be used for web server side inclusion(s). More information about the web server side inclusions is described later in this specification. Another parameter can include a user identifier, query string, a markup language for the client computer (e.g., HTML, WML, etc.), operating system of the client computer 12, a locale or language associated with the client computer 12, or the like. The parsing is highly flexible and can be adapted differently to different network sites.

Returning to block 402 in FIG. 4, a user at client computer 12 can send and the web server 28 can receive a client request including a URL. As an example of the URL portion of the client request can be "http://vvww.homedepot.com/diy_main/pg_diy.jsp?CNTKEY=growit". The method can further comprise applying the mapping algorithm (previously described) to the client request to parse the client request to form parsed elements that correspond to different parameters. At least one of the parsed elements may correspond to a caching-related parameter that can be used to determine when a content component is to be regenerated or its context. The context may include information that can allow a cache manager to later reconstruct an original client request for content that includes the content component in order to perform regeneration and caching of the content component.

The method can comprise generating a mapped filename from at least one of the parsed elements (block 424). One format can comprise a naming convention that uses concatenation of the parsed elements with commas to separate the fields. For example, "0,CNTKEY=growit,00-EN_US.html" may be used. A software component, such as the web server 26 or the page generator 28, may analyze the parsed elements to determine what content is needed for the client request.

Optionally, the method can comprise generating a mapped filename from at least one of the parsed elements (block 424) by applying a hashing function over the parameters in those parsed elements. For example, all the parsed elements may be used in the hashing function. The hashing function may help to control filename explosion within a discrete directory and help keep the number of files in a directory closer to an optimal level for the specific hardware and software configuration used at the network site. For example, the filename might become "EN_US/hash00345/CNTKEY=growit.html".

By using a hashing function to cache files into separately named discrete directories, the method can manage the size of the directory in which a file is cached to a number of files that keeps access and updating operations at an efficient level. In one non-limiting embodiment, the number of files within a discrete directory can be at a level such that file-searching operations can be performed close to the speed of the storage system (e.g., a hard disk). The manageable number may depend on hardware or other limitations of the system. For example, in one system, when the number of files per directory is greater than approximately 4100 files, file operations may begin to take longer than the hardware limitations of a hard disk. The filename mapping can create a filename that allows efficient reproduction of a request for cache regeneration.

The mapping algorithm needs to be known by the software components in the network site for accessing, generating, and storing cached content, but a particular algorithm, such as using a hashing function, is not required to achieve the caching capabilities described herein. Nearly any mapping algorithm can be used. Concatenation and hashing have been described. After reading this specification, skilled artisans will appreciate that many other algorithms can be used. The mapping algorithm produces the mapped filename that may correspond to the client request but uses an internal format understood by software components within the network site. The plug-in 269 can be used to perform the parsing and mapping functions.

After the filename has been identified in accordance with the algorithm, the method can further include determining whether the file(s) is (are) in the cache 29 (diamond 426). This determination can be performed using a conventional method. In one embodiment, after generating the mapped filename, the web server 26 can refer to a file registry within the web server 26 to determine if the mapped filename corresponds to (i.e., matches) a file within the cache 29. If at least one file matches the filename, the method can comprise retrieving the file(s) and sending it (them) to the client computer 12 (block 428). At this point, the method may end.

In still another embodiment, the file(s) may be cached in a memory-only cache with no disk for persistence (e.g., in a volatile memory). The hash can define how to find the file(s) without regard to the directory structure within the cache.

In another alternative embodiment, the web server 26 can perform a web server side inclusion. If some, but not all, of the content component(s) are in the cache 29, the web server 26 may retrieve the file(s) for those content component(s) from the cache 29 and send an instruction to the page generator 28 to generate the missing content component(s). After generation, those remaining content component(s) are sent to the web server 26 where they can be included with the retrieved file(s).

After the web server 26 has all the retrieved or generated content components, the web server 26 can add to or modify information from the file(s) before sending the content to the client computer 12. For example, if the client computer 12 is a cell phone that is designed to work in WML and the content received by the web server 26 is in HTML, the web server 26 can convert the content in HTML to WML. Alternatively, the display for client computer 12 may vary from device to device. For example, if the client computer 12 is a cell phone, the web server side inclusion can reformat the information to be more user friendly for a cell phone. Note that the internal (mapped) filename may or may not be sent or otherwise be available to the client computer 12. Therefore, the client computer 12 does not know the true filename at the network site since the internal mapped filename may include the hashed value needed to locate it within the back-end systems of the network site (e.g., cache 29).

If any file corresponding to the content is not within the cache ("No" branch of diamond 426), the method can further comprise generating the content or any of its content component(s) at the page generator as shown in block 502 in FIG. 5. The page generator 28 can generate the network page or any of its content components that were not in cache 29.

During content generation, the method can also comprise tracking content component(s) and instruction(s) used in generating those content component(s) (block 522). Assume that a fresh page is being created for the first time and requires a content component to be created, and the content component is to be cached separately. During page generation of the overall page, APIs should be configured such that they can cause the content component to be generated as well to track or capture the start and end of the generated content component in the overall page so that the parameters for it are understood as well as the position and extent of the content component. Other tracking information generated by the APIs may correspond to web server side inclusions, which have previously been described. This information might be embedded in markers in the overall page or stored separately from the overall page. This tracking information can be captured by the page generator 28 and then used by the cache manager 24 to store the overall page and its embedded content component as two separately cached pages with a reference to the content component left in the overall page. In this manner, the content component can be referenced by other pages but stored only once.

Examples of content components that may not be cached can include content that changes at a relatively high frequency (e.g., dynamic files with content that changes on an hourly basis or more frequently), such as news headlines or content that is infrequently requested (e.g., the file may be flushed from the cache before a subsequent request for the same file would occur). For example, prior purchases by the user at a network site may not be cached. In one non-limiting embodiment, the servlet 289 may be a J2EE-compliant servlet engine for Java Server Pages ("JSP"). Other types of page generators may be used.

After the content has been generated by the page generator 28, the method can continue with sending the generated content from the page generator 29 to the web server 28 (block 542). The method can further comprise adding content to or modifying the generated content consistent with web server side inclusion(s) (block 562). The adding or modification using the web server side inclusion as previously described. Alternatively, the addition or modification may be a change in a markup language (HTML to WML), reformatting the content for the particular display of the client computer 12 (e.g., cell phone, personal digital assistant, pager, laptop computer, etc.), including the local time of the client computer, or potentially other additions or modifications.

After the web server side inclusions, if any, the method can comprise sending the requested content to the client computer 12 (block 564). Note that the activities used in storing any or all the generated content to the cache may not be completed or even started before the requested content is sent to the client computer 12. Therefore, the client computer 12 should receive the requested content quicker compared to conventional methods.

In an alternative embodiment, the method can include removing or hiding the internally formatted filename from external viewing at the client computer 12. This can be accomplished using simple references (e.g., numeric references) to a managed table that contains the data. The managed table (along with the indices from the API tracking information) can allow an indirect agent (e.g., cache manager 24) to subsequently store the cached version of generated content to memory (e.g., to database 19) while keeping the source reference hidden from the requesting client computer 12.

Referring to reference "B" in FIGS. 5 and 6, the method can further comprise forwarding the generated content and tracking information (generated by the APIs) from the page generator 29 to the cache manager 24 as seen in block 602 in FIG. 6. The generated content can comprise metadata about where to cache the content component(s) if it is (they are) to be cached. The metadata can include opt-in or opt-out parameters, such as whether or not to cache any specific content component, and potentially other parameters, so that effective cached file names (at least partially human understandable names) can be used. Other metadata about the cached file may include information regarding when or how often content for the content components will be updated, revised, or the like. For example, the metadata can include Time To Live (TTL) information, so that automated updates to the content component(s) can occur. This other metadata may be separately provided to the cache manager 24 by a configuration file, as a message to the cache manager 24, or the like.

A determination can be made whether file(s) for the generated content is (are) to be cached (diamond 622). If none of the generated content is to be cached ("No" branch of diamond 622), the process can end.

Otherwise ("Yes" branch of diamond 622), the method can include preprocessing the content component(s) before storing them. Examples include removing any or all of the white space within the source code of the content component, encrypting the content component, counting instances of a particular character, set of characters, object or the like, and nearly any other information that an operator of the network site may desire.

The method can include caching content component(s) at location(s) corresponding to the mapped filename(s) and updating the file registry for the web server 26 (block 626). Note that caching a content component should be construed to include adding or updating an entry within a database.

The cache manager 24 can use a temporary file during the mapping and storing portions of the caching operation. As the generated content is received by the cache manager 24 and placed into a temporary file, the API markers or other metadata corresponding to an aspect of caching (e.g., whether a content component is or is not to be cached, timing regarding updates of cached material, or the like) are examined.

The cache manager 24 can produce TTL timers on its own or that correspond to one of the parsed elements (caching-related parameter) from the client request so that updates can occur on a set schedule, which can be arbitrarily determined for a given application. The file-based caching method can thus provide savings in system performance with regards to the cached file production, can fit naturally into a network site environment, and can provide for a more secure site (the cache manager 24 can "live" behind a network site's firewall (not shown in FIG. 2), such that no processes outside of the firewall can initiate a write to cache 29).

Alternatively, or in conjunction with the TTL timers, the cache manager 24 can also use a caching-related parameter from the parsed elements to determine which network pages need to be regenerated when a specific content component is regenerated (sometimes because the prior information is stale or incorrect).

During mapping, the cache manager 24 can refer to the API tracking information before caching the content component(s), but can still maintain an association between the cached file and the tracking information by virtue of mapping. The mapped filename(s) can be the final cache destination(s) of the file(s) that is (are) to be cached. The cache manager 24 can store the file(s) within the cache 29 and then delete the temporary file. Note that the generation of a temporary file or the storing of the content component is not performed by the web server 26. After mapping and caching are completed, information from the cache manager 24 can be sent to the web server 26 to update the file registry, so that the web server 26 can directly access the cache 29 for the next request for the same or similar content.

In another embodiment, the mapped filename can be generated and temporarily block for a different request for the same content or different content using a common content component that is currently being generated. The blocking may last until the cache placement (storing to cache 29) is completed so that subsequent requests are blocked until the content component is cached. In another embodiment, the blocking may be shorter. For example, the blocking can terminate after the content component is generated if the page generator 28 has access to the mapped filenames or the ability to generate them. In this manner, duplicate requests for the same content component(s) content component being generated or just have may be substantially prevented during the time it takes to produce a cached content component.

In still another embodiment, the page generator 28 may also act as the web server 26 and may fulfill requests from the client computer directly. In yet another embodiment, the page generator 28 may also act as the cache manager 24. However, the same software component should not deliver content to the client computer and store content component(s).

Figure 1:
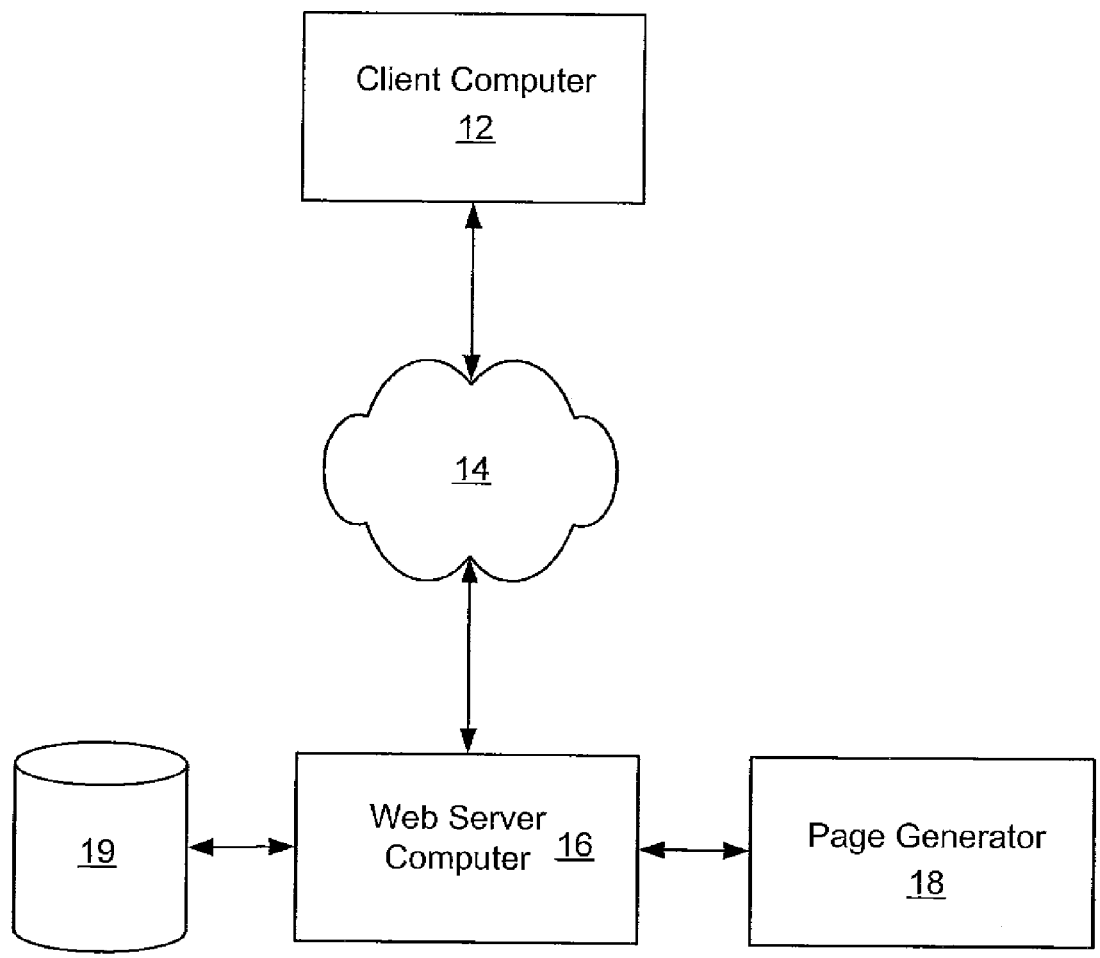
FIG. 1 includes an illustration of a hardware configuration for a network site.

An advantage in some embodiments may include the faster delivery time of content to the client computer 12. Note that the caching of the file(s) corresponding to the generated content can occur asynchronously with respect to the operations at the web server 26. If the cost of producing a cached page in a conventional system (e.g., FIG. 1) is $C_{request}+C_{generation}+C_{placement}$ (where C=cost), the network site configuration in FIG. 2 can eliminate the placement costs by using the servlet 289 to cause at least a portion of the content component being generated to be stored asynchronously. Therefore, the requested content can be provided to client computer 12 without the performance hit caused by storing or caching any or all of the content since the storing or caching operation is not performed by the web server 26.

Still another advantage in one embodiment can include the ability to selectively cache or not cache file(s) (content component(s)) for a generated network page. A network site designer or operator may determine what is or is not to be cached by the cache manager 24. Any file used within the generated content that is dynamic and changes at a relatively high frequency (e.g., new data for every time it is generated) or is likely to be regenerated between requests should not be cached. Caching those file(s) can represent wasted space within the cache and the file directory used with the cache. This aspect of the network site is transparent to the user at client computer 12 except that he or she gets requested content back quicker.

A further advantage can include independently caching content components from network pages. Some of the content components (i.e., files) may be used in other network pages. Storing multiple copies of the same information occupies additional memory space and slows retrieval of this or other content component(s) since the number of stored files may be greater. Therefore, the number of copies of the content component will be less than the number of network pages in which the content component is used, and may be as little as one copy of the component. Also, content component(s) may be stored at locations independent of other content component(s) within the same network page. This can allow better control over the number of files within each discrete directory and speed the read access time for the content component. Additionally, quicker retrieval can translate to quicker delivery of already cached content.

Another advantage in one embodiment may include removing excess white space. Excess white space removal can be an optimization for the cached file because it reduces the number of bytes delivered over the network (e.g., the Internet). By eliminating the white space, the size(s) of file(s) may be 30% smaller within the cache 29. Note that in a non-limiting embodiment, the removal of the white space from a content component is permanent. Simply put, this removal is not conventional file compression. Such a savings can be realized in faster writing and reading times for files.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

What is claimed is:

1. A method for file-system based caching, comprising:
   at a cache manager embodied on non-transitory computer memory including instructions executable by a processor:
   receiving content and tracking information associated with the content, the content generated by a page generator, the page generator communicatively connected to the cache manager, the cache manager and the page generator operating in an enterprise computing environment, the content including one or more content components and metadata;
   based on the metadata, determining whether to cache any specific content component of the one or more content components;
   determining that a first content component of the one or more content components is to be cached;
   determining a location in a hierarchical file-system based cache managed by the cache manager, the location corresponding to a mapped filename previously determined for the first content component, wherein the mapped filename specifies a name for the first content component and a path within the file-system for the first content component; and
   storing the first content component in the file-system based cache at the location corresponding to the mapped filename.

2. The method according to claim 1, wherein the tracking information is generated by an application programming interface interfacing the cache manager and the page generator.

3. The method according to claim 1, wherein the tracking information comprises an instruction used by the page generator in generating the first content component.

4. The method according to claim 1, wherein the cache manager uses the tracking information to store a network page and the first content component in the file-system based cache as two separately cached pages with a reference to the first content component left in the network page.

5. The method according to claim 1, wherein the first content component is referenced by one or more network pages stored in the file-system based cache and wherein the first content component is stored in the file-system based cache only once.

6. The method according to claim 1, wherein the metadata comprises information about where to cache the first content component if the first content component is to be cached.

7. A system for file-system based caching, comprising:
   at least one processor;
   non-transitory computer memory including instructions executable by the at least one processor;
   a hierarchical file-system based cache; and
   a cache manager embodied on the non-transitory computer memory, the instructions when executed by the at least one processor cause the cache manager to:
   receive content and tracking information associated with the content, the content generated by a page generator, the page generator communicatively connected to the cache manager, the cache manager and the page generator operating in an enterprise computing environment, the content including one or more content components and metadata;
   based on the metadata, determine whether to cache any specific content component of the one or more content components;
   determine that a first content component of the one or more content components is to be cached;
   determine a location in the file-system based cache, the location corresponding to a mapped filename previously determined for the first content component, wherein the mapped filename specifies a name for the first content component and a path within the file-system for the first content component; and
   store the first content component in the file-system based cache at the location corresponding to the mapped filename.

8. The system of claim 7, wherein the tracking information is generated by an application programming interface interfacing the cache manager and the page generator.

9. The system of claim 7, wherein the tracking information comprises an instruction used by the page generator in generating the first content component.

10. The system of claim 7, wherein the cache manager uses the tracking information to store a network page and the first content component in the file-system based cache as two separately cached pages with a reference to the first content component left in the network page.

11. The system of claim 7, wherein the first content component is referenced by one or more network pages stored in the file-system based cache and wherein the first content component is stored in the file-system based cache only once.

12. The system of claim 7, wherein the metadata comprises information about where to cache the first content component if the first content component is to be cached.

13. The system of claim 7, wherein the file-system based cache is embodied on a volatile memory that is part of or separate from the non-transitory computer memory.

14. A computer program product for file-system based caching, comprising:
at least one non-transitory computer readable medium storing instructions executable by at least one processor to implement a cache manager for managing a hierarchical file-system based cache, the instructions when executed by the at least one processor cause the cache manager to:
receive content and tracking information associated with the content, the content generated by a page generator, the page generator communicatively connected to the cache manager, the cache manager and the page generator operating in an enterprise computing environment, the content including one or more content components and metadata;
based on the metadata, determine whether to cache any specific content component of the one or more content components;
determine that a first content component of the one or more content components is to be cached;
determine a location in the file-system based cache, the location corresponding to a mapped filename previously determined for the first content component, wherein the mapped filename specifies a name for the first content component and a path within the file-system for the first content component; and
store the first content component in the file-system based cache at the location corresponding to the mapped filename.

15. The computer program product of claim 14, wherein the tracking information is generated by an application programming interface interfacing the cache manager and the page generator.

16. The computer program product of claim 14, wherein the tracking information comprises an instruction used by the page generator in generating the first content component.

17. The computer program product of claim 14, wherein the cache manager uses the tracking information to store a network page and the first content component in the file-system based cache as two separately cached pages with a reference to the first content component left in the network page.

18. The computer program product of claim 14, wherein the first content component is referenced by one or more network pages stored in the file-system based cache and wherein the first content component is stored in the file-system based cache only once.

19. The computer program product of claim 14, wherein the metadata comprises information about where to cache the first content component if the first content component is to be cached.

20. The computer program product of claim 14, wherein the file-system based cache is embodied on a volatile memory that is part of or separate from the at least one non-transitory computer readable medium.

* * * * *